United States Patent [19]

Fasching

[11] 4,451,826

[45] May 29, 1984

[54] SINGLE TRANSMISSION LINE DATA ACQUISITION SYSTEM

[75] Inventor: George E. Fasching, Morgantown, W. Va.

[73] Assignee: The United States of America as represented by the United States Department of Energy, Washington, D.C.

[21] Appl. No.: 303,674

[22] Filed: Sep. 18, 1981

[51] Int. Cl.³ .............................................. H04Q 9/00
[52] U.S. Cl. .......................... 340/825.07; 340/870.04; 340/870.39
[58] Field of Search ...................... 340/825.07, 825.61, 340/825.63, 310 A, 870.24, 870.39, 870.04, 505, 525, 538; 375/22, 23; 370/114, 113

[56] References Cited

U.S. PATENT DOCUMENTS

| | | | |
|---|---|---|---|
| 4,093,946 | 6/1978 | Fowler | 340/310 A |
| 4,103,337 | 7/1978 | Whiteside | 340/505 |
| 4,172,252 | 10/1979 | Wiberg | 340/525 |
| 4,196,417 | 4/1980 | Fasching et al. | 340/825.6 |
| 4,203,096 | 5/1980 | Farley | 340/538 |
| 4,227,181 | 10/1980 | Brittain | 340/825.63 |
| 4,311,986 | 1/1982 | Yee | 340/825.63 |
| 4,316,262 | 2/1982 | Mizuta | 340/310 A |

Primary Examiner—Donald J. Yusko
Attorney, Agent, or Firm—David E. Breeden; Stephen D. Hamel; Michael F. Esposito

[57] ABSTRACT

A single transmission line interrogated multiple channel data acquisition system is provided in which a plurality of remote station/sensors monitor specific process variables and transmit measurement values over the single transmission line to a master station when addressed by the master station. Power for all remote stations (up to 980) is provided by driving the line with constant voltage supplied from the master station and automatically maintained independent of the number of remote stations directly connected to the line. The transmission line can be an RG-62 coaxial cable with lengths up to about 10,000 feet with branches up to 500 feet. The remote stations can be attached randomly along the line. The remote stations can be scanned at rates up to 980 channels/second.

4 Claims, 14 Drawing Figures

[4,451,826]

SINGLE TRANSMISSION LINE DATA ACQUISITION SYSTEM

BACKGROUND OF THE INVENTION

This invention relates generally to multiple channel data acquisition systems and, more specifically, to an improved multiple channel data acquisition system in which data from a plurality of remote stations is acquired over a single transmission line.

It is often required to collect data from a plurality of remotely located transducers or other types of data-gathering devices. For example, in seismic exploration, acoustic signals are injected into the earth from a location near the surface. The acoustic signals radiate downward and are reflected from subsurface formations back toward the surface where they are detected by appropriate transducers. The transducers are generally arrayed throughout the area to be surveyed and are spaced tens or hundreds of feet apart. Hundreds of transducers may be distributed over a site along an assigned path which may approach two miles in length.

Various methods of collecting the data from such an array of transducers at a central receiving station have been proposed from separate transmission wire pairs between each remote transducer and the central station to complex single transmission line systems with time-shared or time-multiplexed acquisition of data values over the single line to which the tranducers are connected.

Using individual cables for each transducer in a system having a large number of transducers over long distances increases the cost of the basic system as well as installation and maintenance cost. Therefore, single transmission line systems have been developed to reduce cabling installation and maintenance cost. However, these systems are limited in the number of transducers which can be powered and monitored from a single central station and are difficult to install in differing situations where the number of remote transducers vary. Therefore, the systems are generally used in fixed monitoring applications or in applications where the number of remote sensors and the interrogation rate is fixed.

Further, when the single transmission line is used to also supply power to the remote sensors on a time-shared basis, the time required to interrogate each remote station becomes excessive. This limits the applications of single line data acquisition systems in the total number of remote sensors and the repetition rate of interrogation of the sensors.

Thus, there is a need for a single transmission line data acquisition system with improvements for flexibility in application and increased channel interrogation rate.

SUMMARY OF THE INVENTION

It is an object of this invention to provide an improved single transmission line data acquisition system.

Another object of this invention is to provide an improved single transmission line data acquisition system capable of handling a varying number of data channels over long distances.

Further, it is an object of this invention to provide an improved single transmission line data acquisition system as in the above objects with increased channel sampling rate capability.

Additional objects, advantages and novel features of the invention will be set forth, in part, in the description which follows, and in part, will become apparent to those skilled in the art upon examination of the following or may be found by practice of the invention. The object and advantages of the invention may be realized and attained by means of the instrumentalities and combinations particularly pointed out in the appended claims.

To achieve the foregoing and other objects, and in accordance with the purpose of the present invention, as embodied and broadly described herein, the single transmission line data acquisition system of this invention may comprise a master station including means for generating address signals in the form of pulses at a selected frequency to separately address a plurality of cycle responsive data channels and receiving data values corresponding to the addressed one of said channels during the address signal period. A plurality of remote station/sensor means corresponding to the plurality of data channels are connected directly via a single transmission line to the master station. Each remote station/sensor includes a presettable address counter which counts the address signal pulses to determine the addressed channel and when addressed, measures and transmits a quantitative data value in the form of a pulse position coded signal over the transmission line to the master station during the address signal cycle for the addressed channel. The master station includes a line voltage control circuit which maintains a constant transmission line operating voltage independent of the number of remote/station sensors connected to the line.

The line voltage is a selected positive voltage applied to the line during a channel scanning cycle. The address pulses are negative pulses to distinguish them from data pulses which are generated by clamping the line to ground or zero volts. This provides high signal level data transmission which enhances false data signal rejection. The line voltage also provides the power for each remote station/sensor.

As many as 980 channels may be connected randomly along the transmission line of up to 10,000 feet, with branches up to 500 feet or less, and scanned at rates of up to 980 channels/second simply by changing the address pulse frequency.

BRIEF DESCRIPTION OF THE DRAWINGS

The accompanying drawings, which are incorporated in and form a part of this specification, illustrate one embodiment of the present invention and together with the description, serve to explain the principles of the invention. In the drawings.

DETAILED DESCRIPTION

Figure 1:
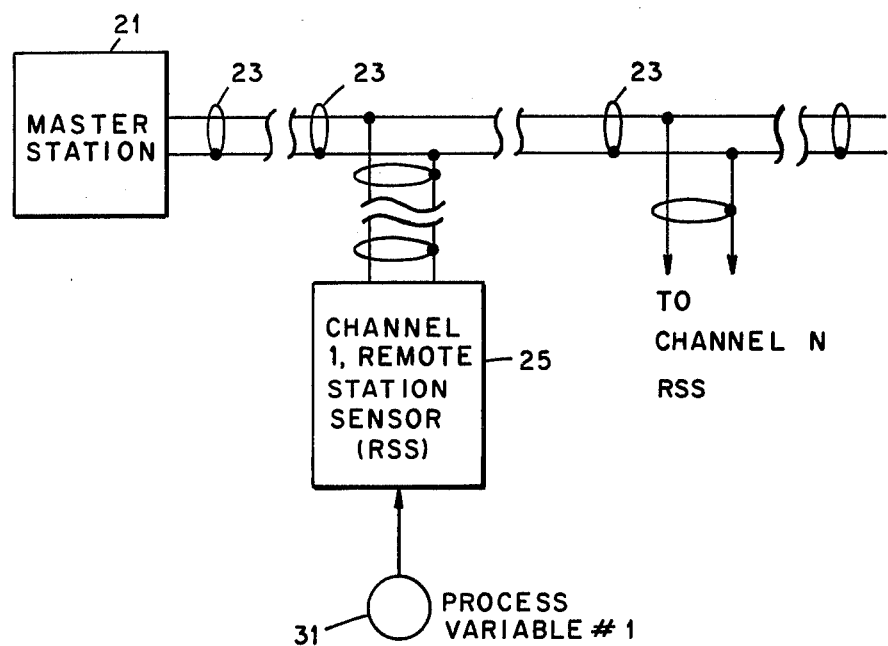
FIG. 1 is a schematic block diagram of a single transmission line data acquisition system according to the present invention.

Referring now to FIG. 1, a master station (MS) 21 drives a coaxial cable transmission line 23 (typically an RG-62 cable) at about 20 mA current at the maximum channel scanning rate of 980 channels/sec. Cable 23, which can be up to 10,000 feet long, is connected directly between the MS 21 and a plurality of remote station/sensors (RSS) 25 (only one is shown in FIG. 1). The line 23 voltage is regulated at the MS output at 35 volts and drops to about 25 volts at the furthest end of the cable. This voltage provides the power for all RSS's 25.

The RSS 25 samples the output of a particular process variable transducer 31 for the particular data channel. The transducer of sensor 31 may take one of many forms such as a seismic sensor, strain gauge bridge, thermistor bridge, resistance thermometer, thermocouple, potentiometer in a level gauge, etc.

Figure 2:
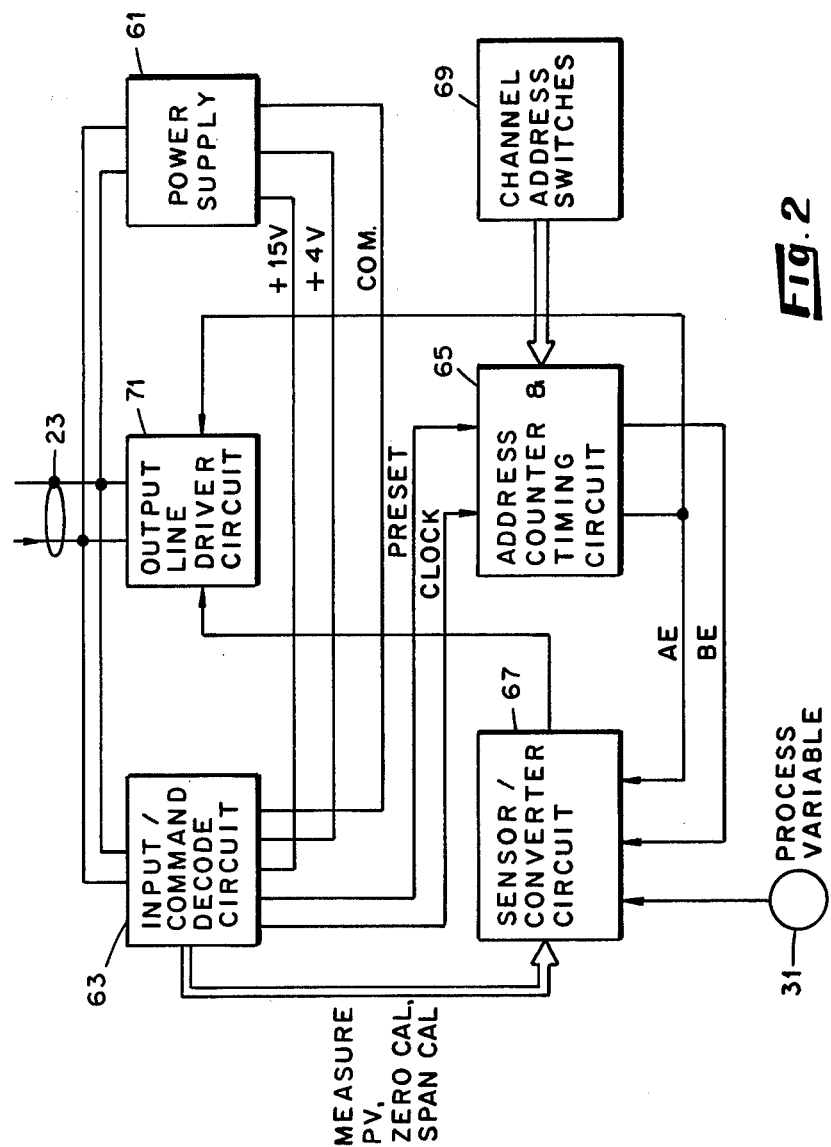
FIG. 2 is a block diagram of the remote station/sensor shown in FIG. 1.

Referring now to FIG. 2, wherein there is shown a block diagram of an RSS 25, the line 23 is connected to the inputs of a power supply circuit 61 and an input and command decode circuit 63. The power supply circuit develops +15 volts and +4 volts from the line voltage. These voltages are used to power the input and command decode circuit 63 and an address counter and timing circuit 65.

The circuit 63 functions to develop preset and clock signals for controlling the address counter 65. Further, it generates command signals for controlling a sensor and converter circuit 67 for initiating a zero calibrate, span calibrate or process variable (pv) measurement when the RSS is addressed. These functions are selected by appropriate signaling from the MS 21 prior to each interrogation cycle. All RSS's (25) then transmit values for the particular commanded operation during the ensuing interrogation cycle.

The address counter and timing circuit 65 includes a presettable address counter which is preset by a bank of channel address switches 69 to the address count value during intialization and is counted down to zero by counting the MS transmitted address pulses during the interrogation cycle. When the counter counts through zero, a data transmit sequence is initiated. The counter clock pulse is extracted from the negative-going leading edge of the MS count pulse, thus, data transmission occurs following the address pulse which counts the particular channel counter to zero. The counter and timing circuit 65 also generates excitation signals (AE+BE) to power up the sensor circuit 67 amplifier and bridge circuit in which the process variable transducer 31 is connected. The sensor converter circuit 67 accepts a millivolt analog signal from its associated process variable transducer bridge circuit and converts it to a pulse pair position signal at the output of an output line drive circuit 71. The pulse pair has a time separation between pulses proportional to the measured process variable at the sensor input. The output of circuit 71 is connected to the line 23 and provides the pulse drive required at the transmission line.

Figure 3:
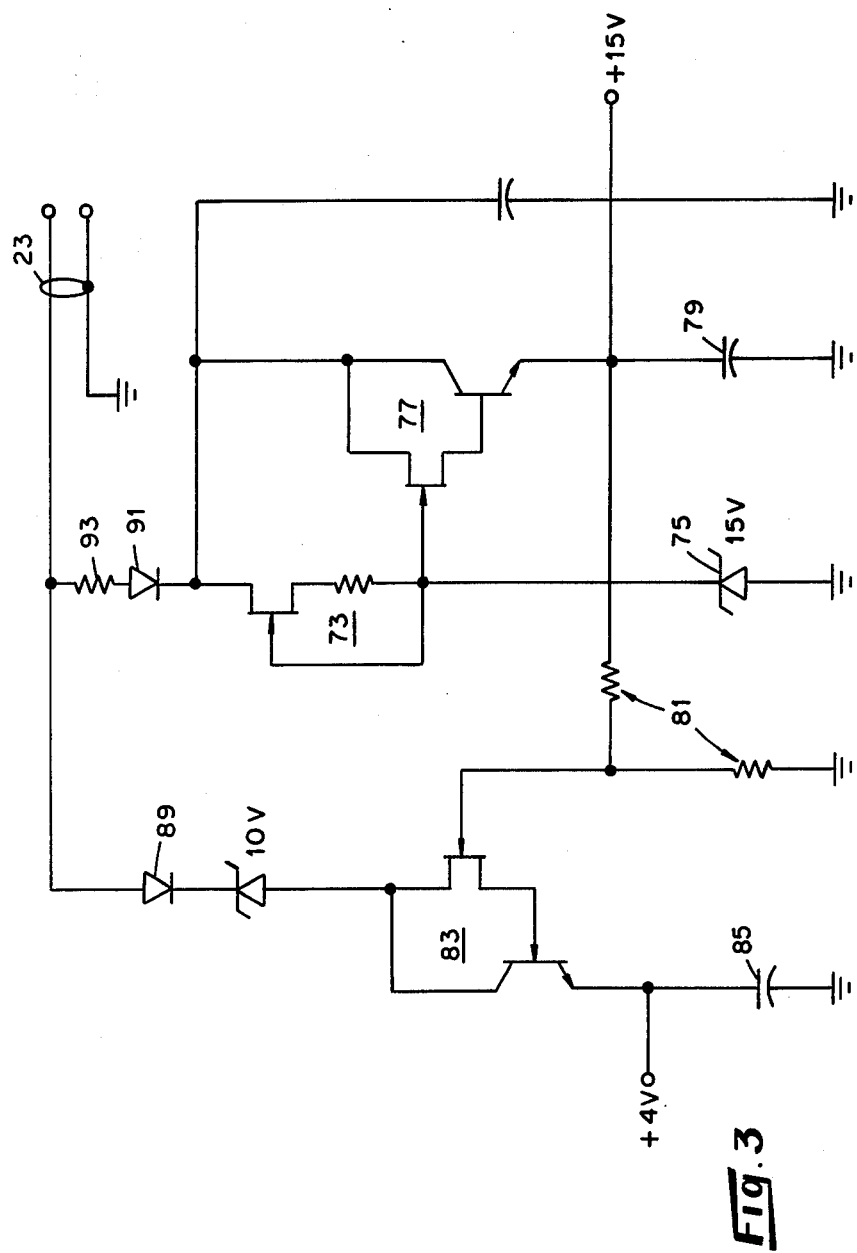
FIG. 3 is a schematic diagram of the power supply circuit shown in blank forms in FIG. 2.

Referring now to FIG. 3, it will be seen that the power supply develops the two operating voltages (+15 and +4V). During the time that the line voltage is high, 25 to 35 volts, a constant current circuit 73 biases a reference diode 75 which yields about 15 volts at the gate of regulator transistor and amplifier 77. This results in a regulated voltage of +15 V at the output of circuit 77. A voltage divider connected to the circuit 77 output supplies an input to an amplifier 83 which delivers +4 V for RSS circuit operation. Capacitors 79, 85 and 87 provide filtering and energy retention during times of non-excitation of the transmission line. Diodes 89 and 91 isolate the RSS from the line 23 while the line is below excitation level (during pulses). A resistor limits the charging current of the power supply at initial power-up and also limits line current in the event of a fault or short in the RSS.

Figure 4A:
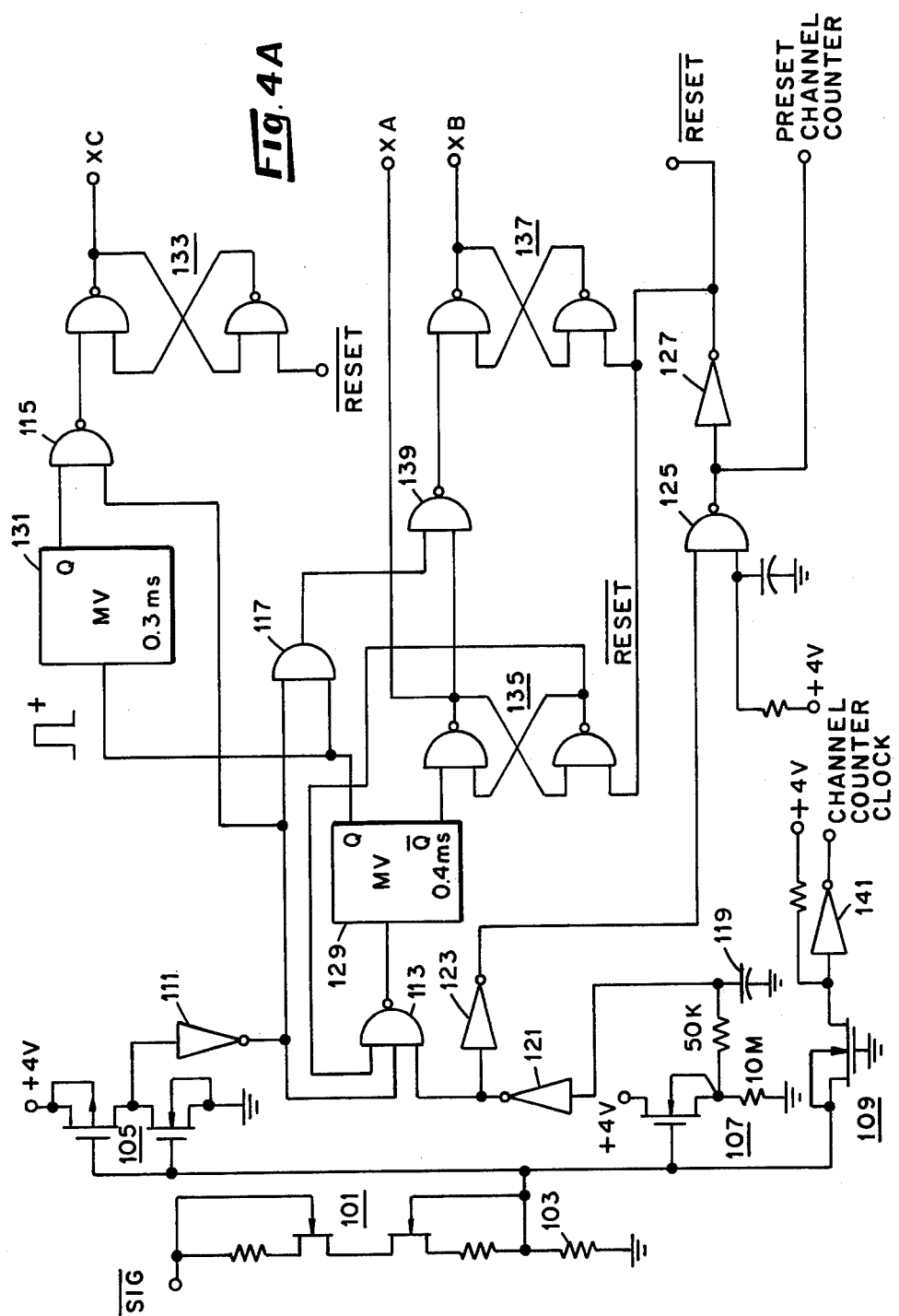
FIG. 4 composed of FIG. 4a and 4b is a detailed schematic diagram of the command decode circuit of FIG. 2.

As shown in FIG. 4a, the input and command decode circuit 63 includes an input circuit 101 connected to receive the transmission line signals (SIG) from the MS 21. The command sequence as well as all address counter negative pulses enter at the terminal designated SIG. Input circuit 101 includes back-to-back FET constant current circuits which accept the bipolar SIG input and yields +5 volts across a load resistor 103 for SIG inputs greater than 8 volts, 0 volt for 0 volt in, and −5 volts for −8 volts or lower inputs. The voltage across the load resistor 103 is supplied to amplifier circuits 105, 107 and 109 which provide proper logic voltage levels for command signal decoding and channel counter clock pulse signal. The output of amplifier 105 is connected through an inverter 111 to one input of a NAND gate 113, a NAND gate 115 and an AND gate 117. The output of amplifier 107 is supplied to a capacitor 119 and an inverter 121. The output of inverter 121 is connected to an input of gate 113 and an inverter 123. The output of inverter 123 is connected to one input of a NAND gate 125 which is enabled by the application of the +4 V from the power supply to the other input. The output of gate 125 provides a positive channel counter preset signal and via an inverter a negative reset signal.

To decode the command sequence prior to an interrogation cycle, the output of gate 113 is connected to the output of a 0.4 ms multivibrator MV 129 whose Q output is connected to one input of gate 117 and the input of a 0.3 ms MV 131. The Q output of MV 131 is connected to one input of gate 115 whose output is connected to the set input of a flip-flop 133. The reset input of flip-flop 133 is connected to receive the $\overline{\text{RESET}}$ signal from inverter 127. Flip-flop 133 is set to provide a "high" on the Q output line XC when a third or "C" command pulse is present in the MS 21 command code (see FIG. 5) prior to an interrogation cycle. An XA signal line is provided at the Q output of a flip-flop 135 is "high" when an "A" command pulse is received. This is obtained by connecting the $\overline{Q}$ output of MV 129 to the set input of flip-flop 135. An XB signal line is provided at the Q output of a flip-flop 137 which goes "high" when a "B" command pulse is present. The set input of flip-flop 137 is connected to the output of a NAND gate 139 which has one input connected to the output of gate 117 and a second input connected to the Q output of flip-flop 135. The reset inputs of both flip-flops, 135 and 137, are connected to the $\overline{\text{RESET}}$ line.

Figure 4B:
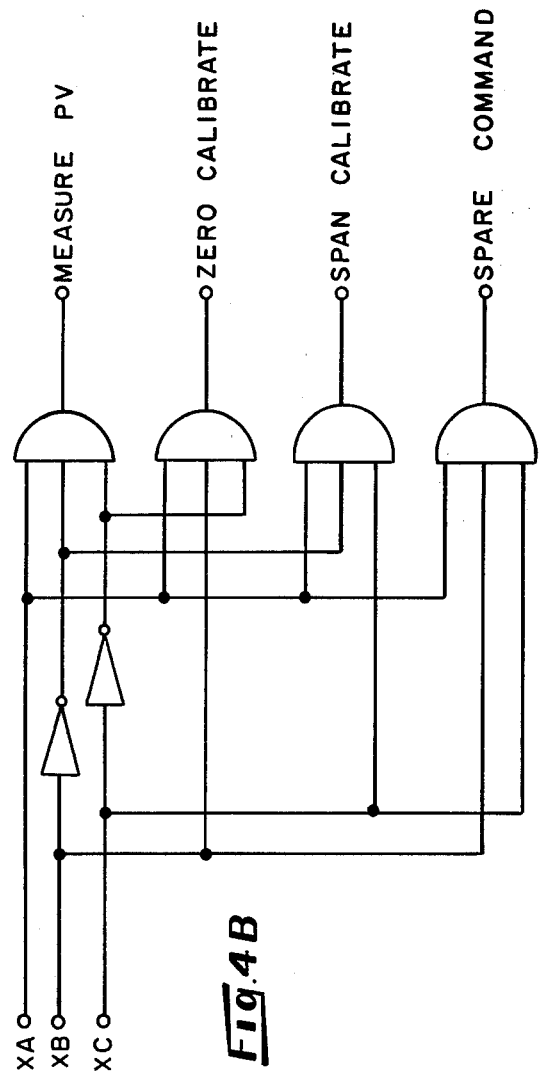

As shown in FIG. 4b, the XA, XB and XC lines are connected to a combinational logic circuit which decodes the command and provides an output signal on one of four outputs—either a measure pv, a zero calibrate, a span calibrate, or a spare command depending on the command pulse code.

Figure 5:
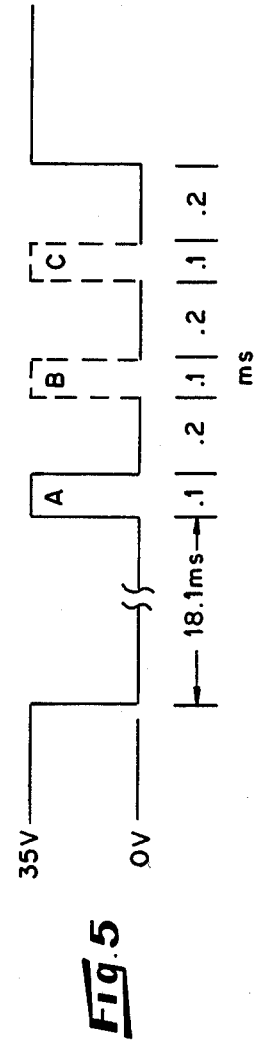
FIG. 5 is a graphic illustration of the channel address/drive signal showing the command code modulation.

Referring now to FIG. 5, in conjunction with FIG. 4a and 4b, it will be seen that an interrogation cycle is initiated from the MS 21 by transmitting a command code pulse sequence as shown in FIG. 5. Assuming that all RSS's have been fully powered up and reset by applying a constant voltage of 35 volts to the transmission line 21 at the MS 21 end for several minutes prior to the command code pulse train, all RSS's are set up to execute a measure pv, a zero calibrate, a span calibrate, or a spare command in that interrogation cycle. The sequence starts with an 18.1 ms zero level signal. This allows the 600 pF capacitor 119 to discharge sufficiently to enable gate 113 via inverter 121. At that instant all inputs of gate 113 become "high". Its output then goes low. It stays low until SIG goes "high", upon which time it, as $\overline{\text{SIG}}$ rises, triggers MV 129. Multivibrator 129 has an on-time of 0.4 ms which can been seen to drop out between pulses B and C in FIG. 5. The Q output is "high" during this interval and if a "B" pulse is then present, it will be transmitted through gates 117 and 139 where it will set flip-flop 137. Flip-flop 135 is set prior to this by the Q output of multivibrator 129 causing XA to go high which it will for all command sequences. If a "B" pulse is not present, XB will remain low. The Q output trailing edge triggers MS 131, which has an on-time of 0.3 ms. Therefore, if a "C" pulse is present it is gated into and triggers flip-flop 133 to the set state, XC high. If no "C" pulse is included in the command sequence, then XC will remain low. XA, XB and XC are inputs to the combinational logic circuit in FIG. 4b that generates a particular command signal—either a measure pv, a zero calibrate, a span calibrate, or a spare command. As seen in FIG. 4a, multivibrator 129 is only triggered once during a command sequence due to the non-equal charge/discharge time constants of the capacitor 118 and the close spacing of pulses A, B, C, and fast return to high level after C. During pulse A, gate 113 is disabled and remains disabled. The only time it is enabled is during a long negative SIG period of at least 6 ms.

When the RSS's are powered up, the flip-flops 113, 135 and 137 are reset. They are also all reset while gate 113 is enabled by a high output from inverter 121 which occurs several milliseconds preceeding pulse A and also during the first approximately 50 μs of pulse A. Amplifier 109, a common gate amplifier, provides a level translation function for the negative 6 volt counter clock signal to a +4 volt level when inverted by inverter 141. The positive pulse called, channel counter clock, is sent to the channel counter along with the preset channel counter signal.

Figure 6:
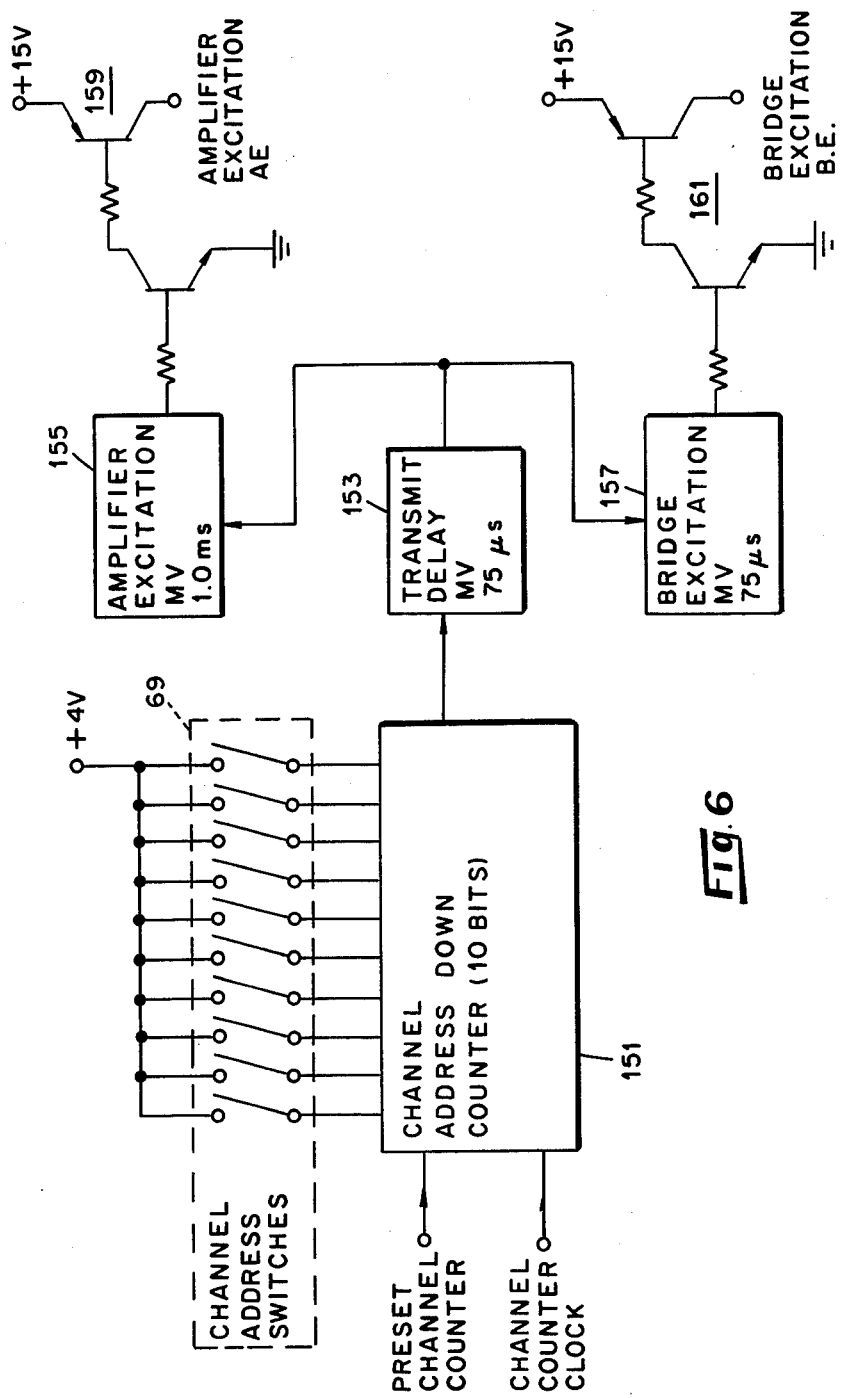
FIG. 6 is a schematic block diagram of the channel address counter and timing circuit of FIG. 2.

As shown in FIG. 6, the preset channel counter signal line from gate 125 is connected to the preset input of the channel address down counter 151. This is a 10 bit parallel load counter which accepts the channel binary address according to the settings on the manual switches 69 when the preset is activated. Once the command sequence is completed, the counter 111 is counted down one count at the leading edge of each negative pulse of the SIG from the MS 21. The instant the counter counts through zero, it generates a start transmit sequence pulse. This pulse triggers a transmit delay MV 153 which provides a 75 μs delay before starting the addressed channel data transmission to allow time for the MS 21 to prepare for receipt of data pulses from the addressed channel RSS. When MV 153 times out, the trailing edge of the pulse simultaneously triggers an amplifier excitation MV 155 and a bridge excitation MV 157. The outputs of multivibrators 155 and 157 are coupled to transistor excitation drivers 159 and 161, respectively, which generate the AE and BE excitation signals to perform the commanded measurement. The amplifier excitation (AE) is applied for 1 ms, the period of MV 155, the bridge excitation (BE) is applied for 75 μs, the period of MV 157, to the sensor converter circuit 67 shown in FIG. 7.

Figure 7:
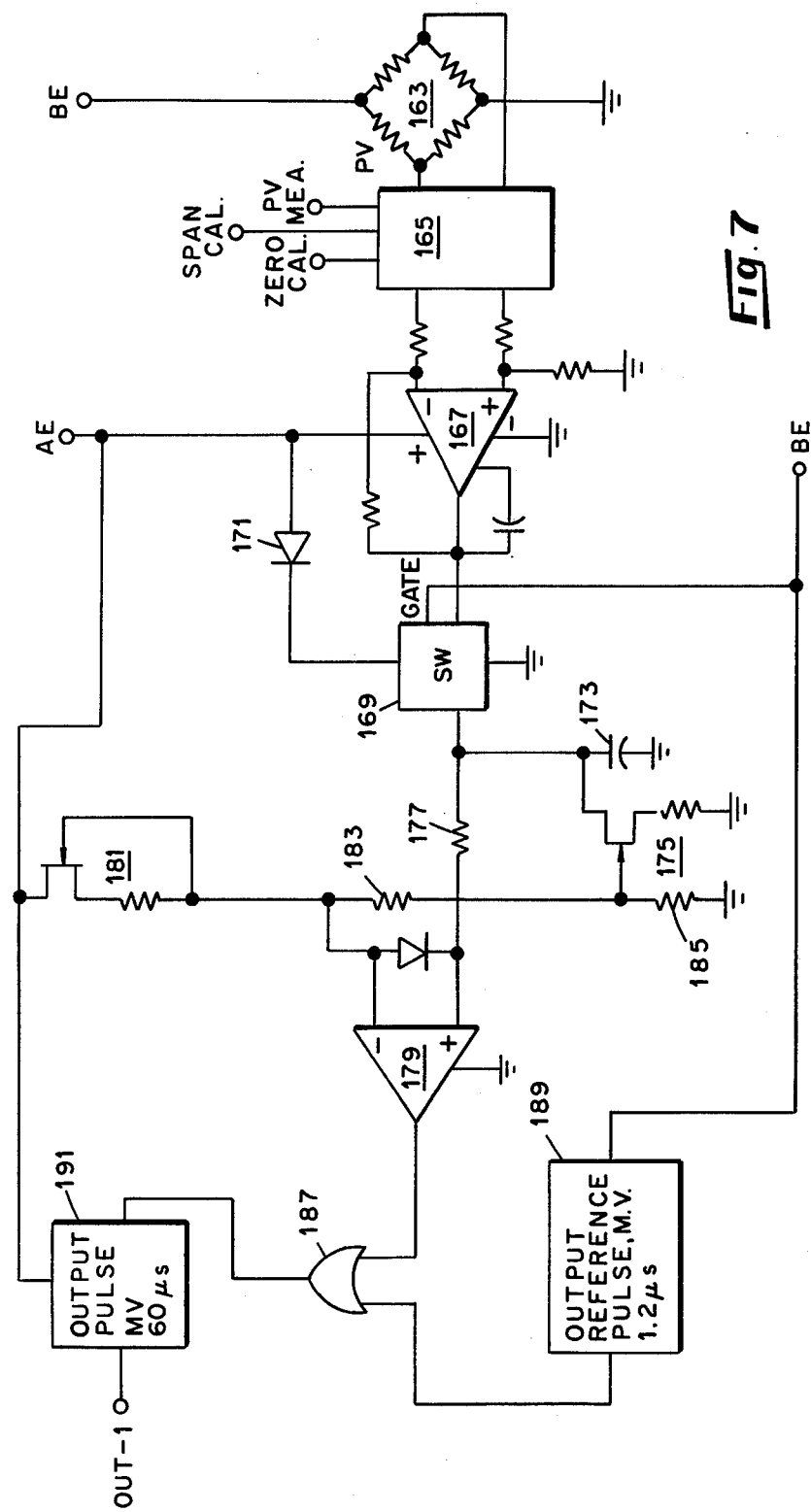
FIG. 7 is a schematic block diagram of the sensor/converter circuit of FIG. 2.

The sensor shown in FIG. 7 is a bridge circuit 163 which could consist of strain gauges for sensing pressure, strain, torque, etc., or a resistance temperature detector bridge, or any one of many types of bridge sensors. The bridge excitation (BE) supplies +15 volts to the bridge 163 whose output is connected to the input of an analog switching circuit 165. The switching circuit is responsive to the command from the command combinational logic circuit shown in FIG. 4. The output of the bridge 163 is switched onto the input of an amplifier 167 when a pv measurement is commanded. The amplifier 167 is activated by the application of the AE signal. The bridge signal is amplified to several volts and applied to the input of an analog switch 169. The switch 169 is gated "on" during the bridge activation by applying the BE signal to a gate input thereof. The AE signal is connected through a diode 171 to the power supply input of the switch to activate the switch.

The switch 169 remains on for the BE signal period coupling the amplified bridge signal to a storage capacitor 173 connected between the output of switch 169 and ground potential. The capacitor 173 is charged during the BE period.

The measured value stored by capacitor 173 is transmitted to the MS 21 by means of pulse position modulation of the transmission line drive signal during the period following the address pulse which addressed the particular RSS. This is accomplished by timing the controlled discharge of the capacitor through a constant current control circuit including a field effect transistor circuit 175 connected across the capacitor 173. Further, the capacitor 173 is connected through a resistor 177 to the non-inverting input of a comparator 179. The reference voltage for the comparator is provided by a second constant current circuit including FET circuit 181 and voltage dividing resistors 183 and 185, all connected in series between the AE signal supply line and ground potential. The inverting input (−) of comparator 179 is connected to the circuit 181 and resistor 183 junction which biases the comparator to the voltage across both resistors 183 and 185. The resistor values and the current flow are selected to provide the proper reference bias. Further, the gate of FET 175 is connected to the resistor 183 and 185 junction so that it is properly biased for a selected constant current discharge of capacitor 173.

To complete the sensor/converter circuit the output of comparator 179 is connected to one input of an OR gate 187 which has its other input connected to the output of an MV 189. The input of MV 189 is connected to the BE signal supply line and generates a 1.2 μs pulse when the excitation BE signal is first activated. The output of the OR gate 187 is connected to the input on an MV 191 which generates a 60 μs output pulse (OUT-1) each time it is activated by the pulse position modulation control circuitry.

The reference pulse of the data pulse pair is generated when the output reference pulse MV 189 is triggered at the start of the bridge excitation (BE) period. This triggers the output pulse MV 191 to generate a 60 μs pulse at OUT-1. The second data pulse is generated when the capacitor 173 is discharged by the constant current circuit 175 down to the reference voltage threshold of comparator 179. As the voltage crosses the threshold at the inverting input of comparator 179, the output goes positive triggering MV 191 to generate the second 60 μs pulse at OUT-1.

The time between the data pair pulses is a function of the voltage at the instant the BE signal is removed, the constant discharge current from FET 175, and the comparator 179 reference threshold. Since the latter two are fixed, then the time is dependent only on the capacitor 173 voltage before discharging and that voltage is proportional to the bridge voltage at the end of the bridge excitation period. The capacitor voltage may be a pv measurement value, a zero calibrator value, or span calibrate value, depending on the commanded function.

Figure 8:
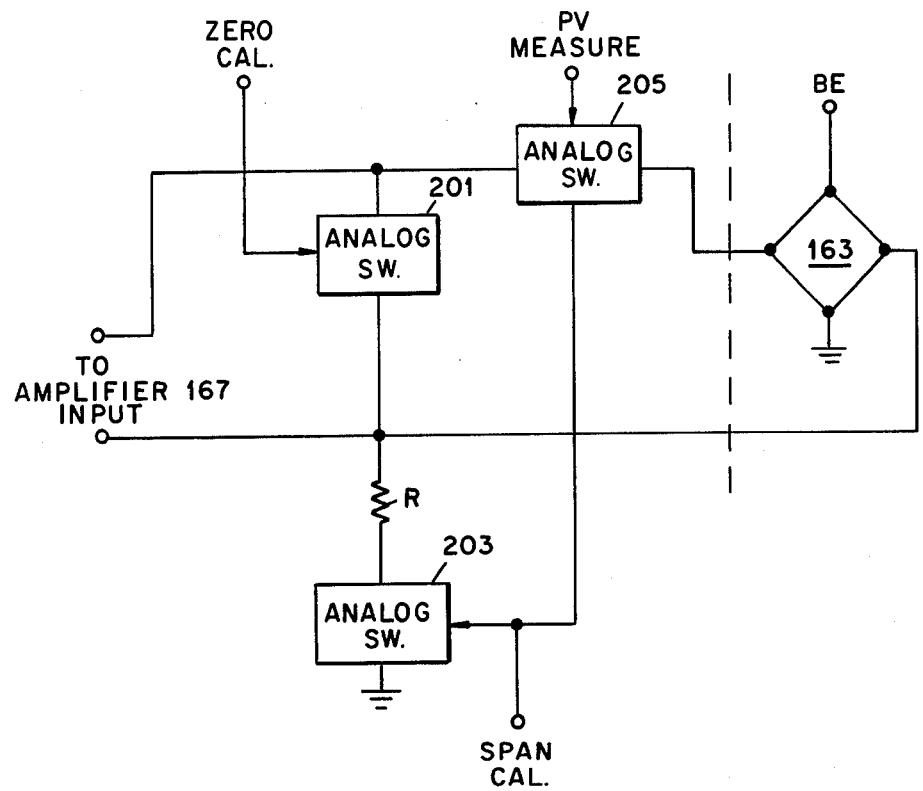
FIG. 8 is a block diagram of the analog switching circuit of FIG. 7.

FIG. 8 shows the analog switch 165 gating required to implement the commanded functions. When the pv measurement command line is high both zero and span lines are low. Analog switches 201 and 203 are open and switch 205 is closed applying the bridge output to the amplifier 167 input. When zero calibrate goes high, then switch 201 closes, impressing a "short" on the amplifier 167 input. A high at the span calibrate input closes switches 203 and 205 (201 open) and places an imbalance on the bridge 163 by a controlled amount with resistor R to provide a span measurement.

Figure 9:
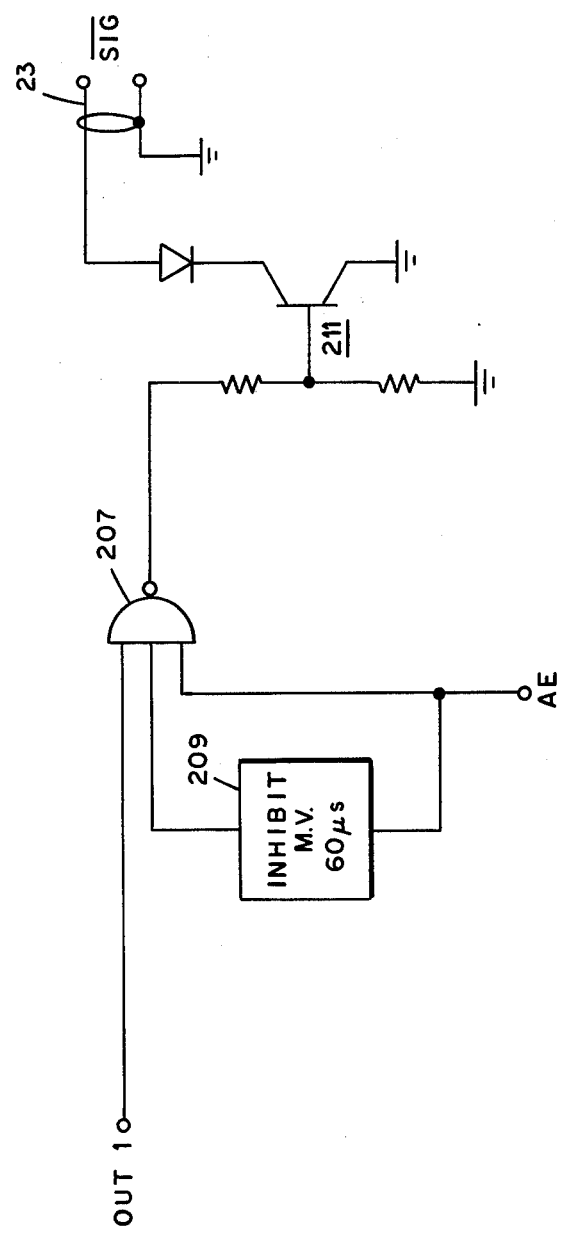
FIG. 9 is a schematic diagram of the line driver output circuit of FIG. 2.

FIG. 9 shows the output line driver circuit 71 (FIG. 2). The OUT-1 pulses from the output pulse MV 191 (FIG. 7) are supplied to one input of an AND gate 207. A second input of AND gate 207 is connected to the output of an MV 209. The AE signal line is connected to a third input of AND gate 207 and the input of MV 209. The MV 209 generates an output to inhibit gate 207 for 60 μs after the application of AE to prevent an extraneous output pulse from the output pulse MV 191 (FIG. 7) at the instant it is energized by the AE signal.

Figure 12:
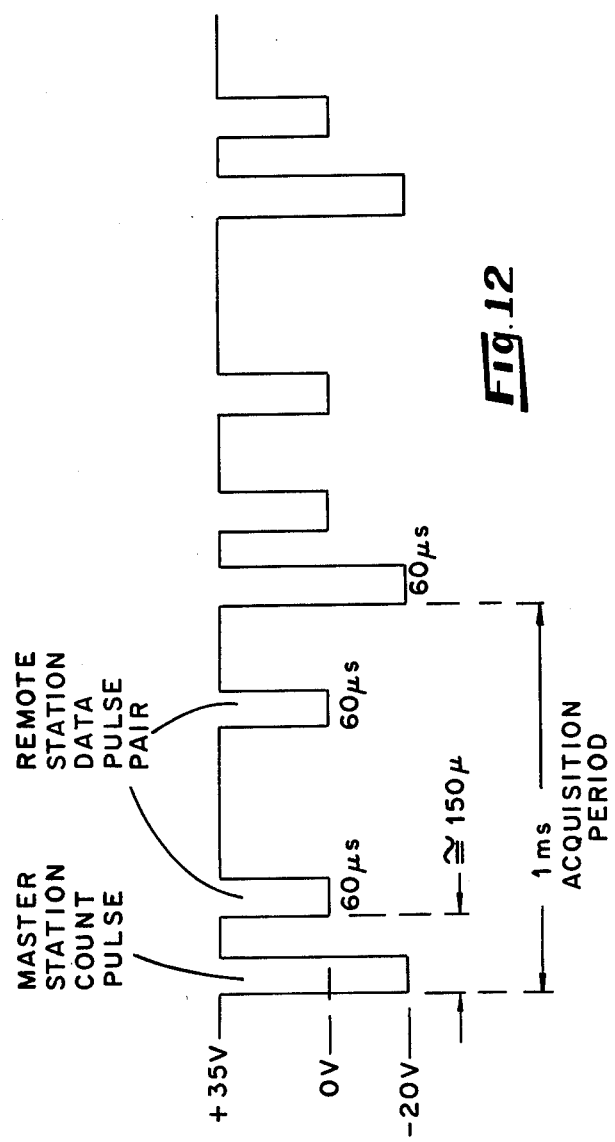
FIG. 12 is a graphic illustration of the signal waveforms during a channel acquisition and data pulse cycle.

The output of AND gate 207 is connected to a transistor switching network 211 which drives the line 23 to near zero voltage during each data pulse period as shown in FIG. 12. Each data pulse which generates an OUT-1 signal is gated through AND gate 207 to turn the transistor switch 211 "on", thereby applying ground potential to the line 23.

Figure 10:
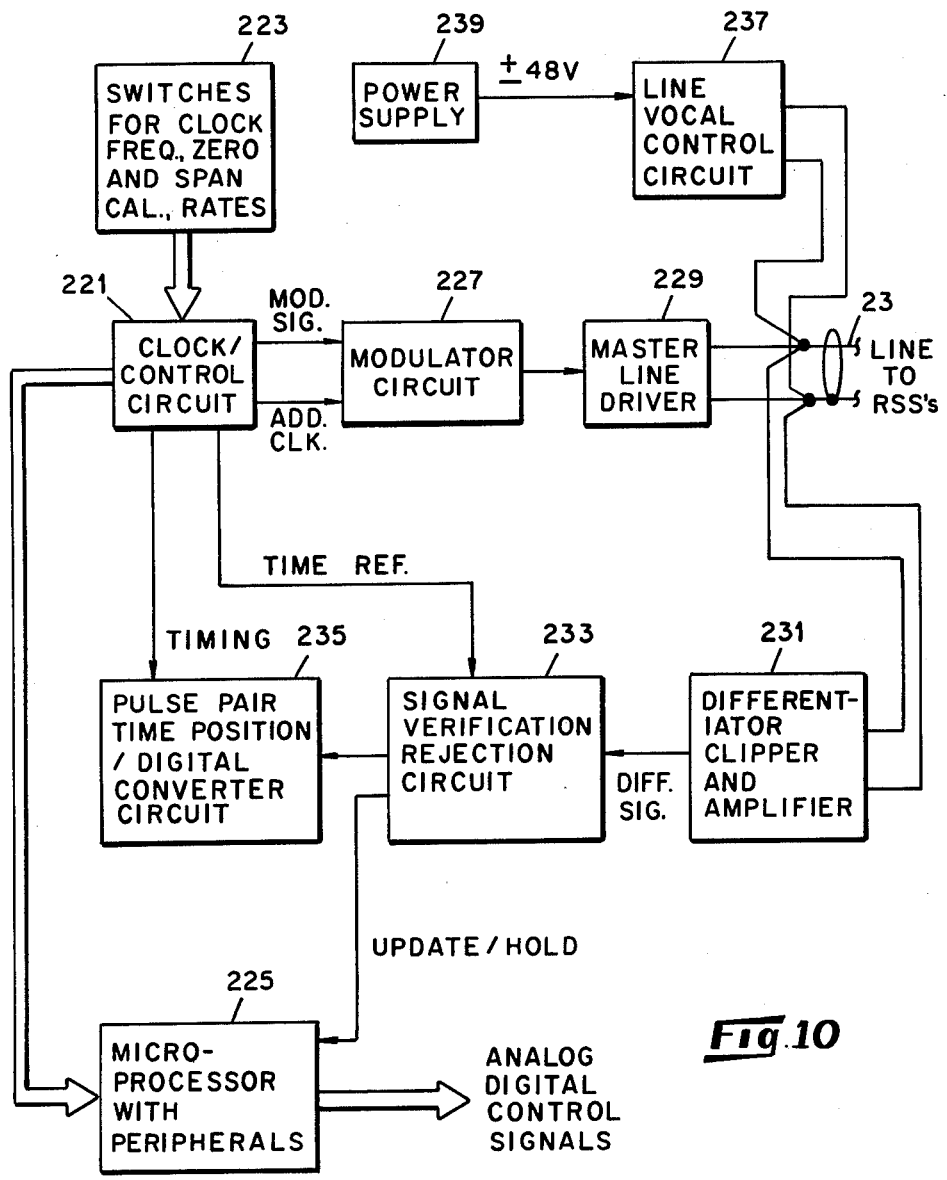
FIG. 10 is a block diagram of the master station shown in FIG. 1.

Referring now to FIG. 10, there is shown a block diagram of the master station (MS) 21 connected to the transmission line 23. Only one MS is required to serve up to 980 RSS units. The MS function is to provide all drive current to power up all RSS units, control and timing of transmitted and received signals, detection/rejection of received signals and conversion of data pulse pair position to binary digital values.

A clock/control circuit 221 provides all timing and control commands. A set of switches 223 are provided to program the clock frequency which determines the interrogation scan rate and the zero and span calibration rates. Switches 223 switch resistance or capacitance into or out of a free running multivibrator clock circuit to change clock frequency. The switch state of some of the switches also preset channel down counters and zero and span down counters. These determine the number of channels scanned and scans between zero and span calibration as the counters count down to zero. If zero and span occur on the same cycle, then zero calibration is performed on that cycle and span calibration the next cycle. The counters are preset after each execution. If a zero or span is not required, then a pv measurement is automatically performed.

The digital channel address is supplied to a microprocessor or any other user devices from the control circuit 221. The control circuit provides timing and time reference signals for proper data pulse interpretation, identification, and conversion. It also delivers a command sequence modulation signal and address clock pulses to a modulator circuit 227. The circuit 227 modulates the address clock pulse signal by generating the command code sequence for RSS control as described above prior to each interrogation cycle. This is accomplished by timing circuits that are triggered in sequence and gated by the pv, zero and span commands with gate logic to generate the modulation pulse train. This is used with gates mixed with the address clock signal in modulator circuit 227 to generate the command pulse sequence and address signal for line driver 229.

The modulated address signal is supplied to the input of a master line driver 229. The line driver clamps the transmission line 23 to zero volt level between the command pulse sequence and to negative 20 volts level for the period of each address count pulse as shown in FIG. 12.

Figure 13:
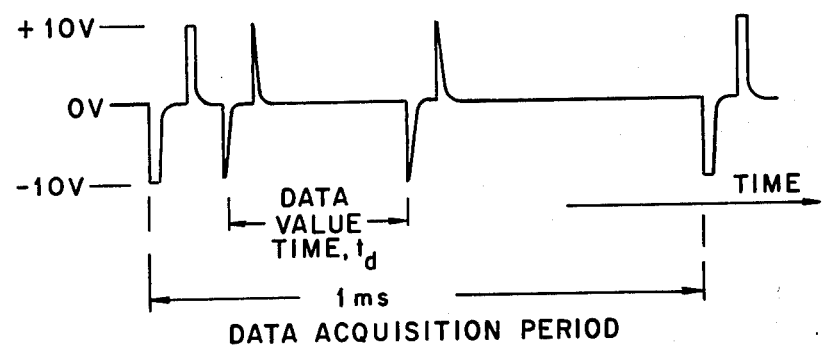
FIG. 13 is a graphic illustration of the differentiated data pulse output of the differentiator, clipper and amplifier circuit of FIG. 10.

The data pulses from each RSS are propogated along the cable 23 to the MS during the period following each negative address pulse. The data pulses are sensed by a differentiator/clipper and amplifier circuit 191. The pulses are first differentiated since only the leading edge relative position transmits the data, then they are clipped to yield a more uniform height and then amplified up to about 10 volts logic level, as shown in FIG. 13. The time $t_d$ between the leading edges of the data pulse pair is proportional to the measured value at the addressed RSS. This can be a pv measurement, zero calibrate measurement or span calibrate measurement depending on the command code for a particular interrogation cycle.

A signal verification circuit 233 controlled by the MS clock control 221 may be used to compare channel-per-channel the previous scan acquired data values to reject erroneous values which are not within a preselected time range of expected values or changes in values. Timing circuits triggered by the time reference signal from clock 221 provides reference timing and when used with gating for digital comparison with the data pulse sequence detects out-of-tolerance relative timing of the first four pulses of the data acquisition period shown in FIG. 13 and relative timing for the next two pulses (data pulses), and also determines if $t_d$ is outside the normal range. Comparisons of the scan sets of data values may be accomplished with the microprocessor and its memory. It receives signals from 233 identifying channel number scanned, command, etc.

Thus, the timing of the pulses and polarity are compared to the time reference and to expected relative time position and if not within tolerance, the data is rejected by not updating the data stored in the microprocessor 225 memory for the corresponding channel. The differentiated data pulse signal, circuit 231 output shown in FIG. 13, consists of a negative-going pulse derived from the leading edge of the MS address count pulse shown in FIG. 12, a positive pulse (about 75 μs later) derived from the trailing edge of the MS address pulse, a negative pulse (75 μs later) derived from the leading edge of the reference data pulse, and a positive pulse (60 μs later) from the trailing edge of the reference data pulse, a negative data pulse ($t_d$ μs later, $t_d$ being proportional to the data value), and a positive pulse (60 μs later) derived from the trailing edge of the second date pulse.

The signal verification circuit output is a positive pulse pair being $t_d$ μs displaced. This signal is supplied to a pulse pair time position converter circuit 235 which converts the pulse pair time ($t_d$) to a digital value for storage in the microprocessor 225 memory if the update/hold line from circuit 223 is properly activated, indicating a proper value for storage update. The data value along with the digital channel address is supplied to the microprocessor 225 simultaneously. The update/hold control signal determines whether the new data value is stored or the previous value is retained. The microprocessor with peripherials may take various forms depending on the application. Data storage, recording, processing, and display occurs in this section. Control signals may be generated for process control use if desired.

Figure 11:
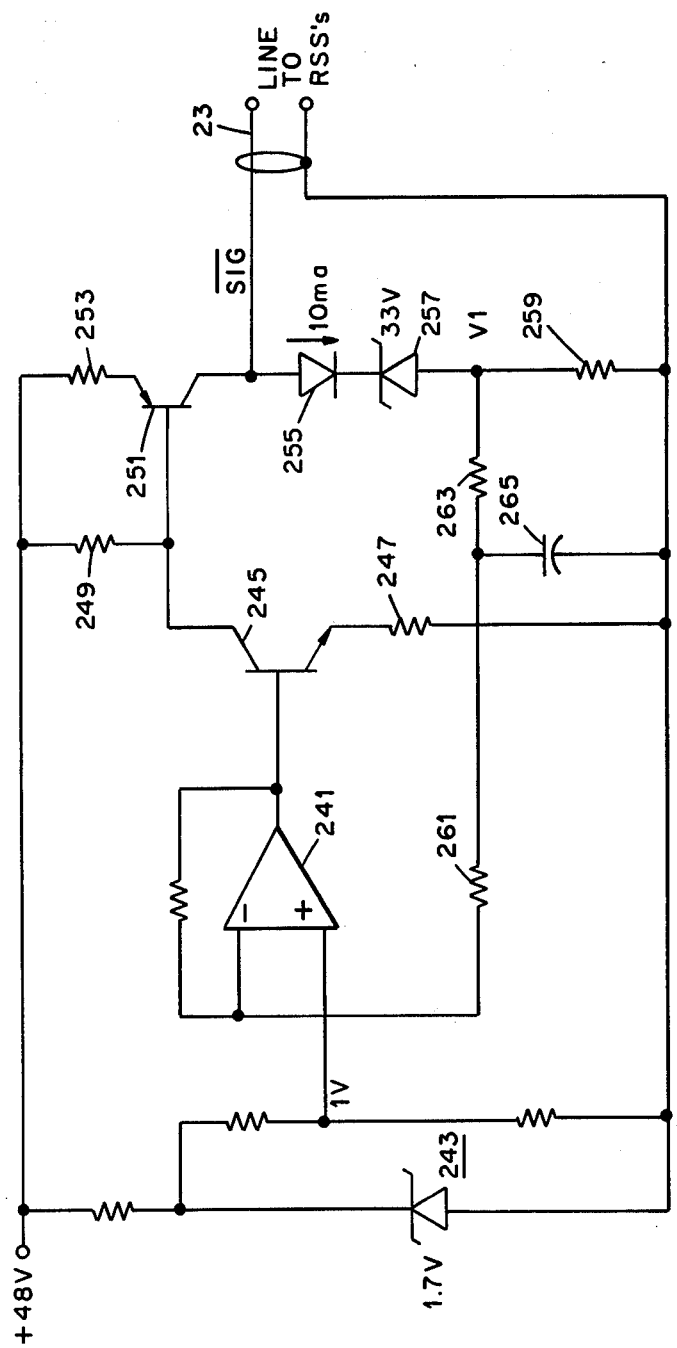
FIG. 11 is a schematic diagram of the line voltage control circuit of FIG. 10.

In order to maintain the transmission line voltage constant independent of the number of RSS units connected to the line. The MS 21 includes a line voltage control circuit 237 which connects directly to the line 23. As shown in FIG. 11, the voltage control circuit includes an operational amplifier 241 in a feedback control loop to maintain the line 23 at approximately 35 volts during the time when there are no pulses applied to the line. This line voltage is derived from a +48 volt supply output of the MS power supply 239. A voltage divider network 243 connected between the +48 volt supply line and the circuit common, or cable 23 shield lead, provides a +1 volt reference voltage to the noninverting input (+) of amplifier 241. The output of amplifier 241 is connected to the base of a transistor 245 connected between the +48 volt supply line and the circuit common line with appropriate biasing resistors as shown. The collector of transistor 245 is connected to the base of a second transistor 251 which has its emitter connected through a resistor 253 to the 48 volt line and its collector connected to the cable 23 center conductor. Further, the collector of transistor 251 is connected to the common line through a forward biased diode 255, a reverse biased zener diode 257 and a resistor 259. The inverting input (−) of amplifier 241 is connected through resistors 261 and 263 to the zener diode 257 and resistor 259 junction. The resistor 263 and the capacitor 256, connected between the resistor 261 and 263 junction and the circuit common provide a low pass filter which prevents the voltage control circuit from responding to the address count and data pulses on the line 23.

If the voltage across the resistor 259 is greater than the volt reference, then the output of amplifier 241 will drop, reducing the collector current of transistors 245 and 251. The reduction in current will lower the voltage on the transmission line 23 such that V1 approaches +1 volt. This control action tends to maintain the current through the 33 V zener diode 257 at 10 mA so that the current supplied by transistor 251 is regulated to 10 mA above the current drawn by the transmission line 23. For example, if the line current is 20 mA (at 35 V excitation), then transistor 251 would deliver 30 mA.

Thus, it will be seen that a single transmission line data acquisition system has been provided which is easier and less expensive to install and service than a system requiring multiple data transmission and/or power transmission lines. Further, all data signals are relatively high level (+10 volt), pulse position modulated and are, therefore, less susceptible to interfering noises, including common mode, electromagnetic interference, etc. Up to 980 stations may be connected at points along the line which may extend up to 10,000 feet from the master station with up to 500 feet of branch cable. Any number of remote station/sensors (RSS's) may be connected and scanned at selected rates of up to 980 channels/sec. simply by changing the master counter clock frequency. The system will automatically maintain the line voltage constant independent of the number of RSS's connected to the line.

The foregoing description of one embodiment of the invention has been presented for the purpose of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A single transmission line multiple channel data acquisition system, comprising:

a master station means for generating address pulses at a selected frequency for separately sequentially addressing a plurality of cycle responsive data channels during a scanning sequence and receiving quantitative data values corresponding to the addressed one of said channels during an address pulse cycle period;

a plurality of remote station/sensor means corresponding to said plurality of data channels, each remote station/sensor means including a power storage means responsive to a supply voltage applied to an input of said remote station/sensor means for storing electrical energy to power said remote station/sensor means, a presettable address counter means for counting said address pulses received at said input thereof to determine when the channel is addressed in accordance with a preselected count of said address pulses and transmitting circuit means for measuring and transmitting the addressed channel quantitative data value in the form of a pulse position coded signal at an output of said remote station/sensor means;

a transmission line connected between said master station and the input and output of each of said plurality of remote station/sensor means for transmitting said address pulses to each of said plurality of remote station/sensor means and said pulse position coded signals from each of said plurality of remote station/sensor means to said master station means; and means for automatically maintaining a constant supply voltage on said transmission line for charging each power storage means of each of said remote station/sensor means independent of the number of said plurality of remote station/sensor means.

2. The system as set forth in claim 1 wherein said transmission line is a coaxial cable having a central conductor and a shield conductor.

3. The system as set forth in claim 2 wherein said means for automatically maintaining a constant voltage on said transmission line includes a power source; a comparator amplifier; means for establishing a preselected reference voltage at a first input of said comparator amplifier; a current regulating means responsive to the output of said comparator amplifier for regulating the current from said power source to said central conductor of said transmission line; a voltage regulator means responsive to the output of said current regulating means for regulating the voltage applied to said transmission line at a preselected voltage value and generating a feedback signal to a second input of said comparator amplifier when said preselected voltage value changes so that the current applied to said transmission line is regulated to maintain said preselected voltage value.

4. The system as set forth in claim 3 further including means for remotely calibrating each of said plurality of remote station/sensor means for zero and span; wherein each of said remote station/sensor means includes a process variable data value measuring transducer connected to said transmitting circuit means, wherein said master station means includes a command signal generating means for selectively transmitting calibration command signals to each of said remote station/sensor means prior to said scanning sequence, and wherein each of said remote station/sensor means includes a command decode means responsive to said command signals for obtaining the commanded one of said zero and calibration command measurements during said scanning sequence, and supplying the commanded calibration measurements to said transmitting circuit means of said remote station/sensor means during said address signal cycle period so that the selected calibration measurement is transmitted to said master station as said addressed channel quantitative data value.

* * * * *